(No Model.)

E. L. HYDE.
CHART.

No. 266,628. Patented Oct. 31, 1882.

WITNESSES:
John S. Thurn
L. Knight

INVENTOR:
Edward L. Hyde

UNITED STATES PATENT OFFICE.

EDWARD L. HYDE, OF CENTREVILLE, RHODE ISLAND.

CHART.

SPECIFICATION forming part of Letters Patent No. 266,628, dated October 31, 1882.

Application filed August 23, 1882. (No model.)

*To all whom it may concern:*

Be it known that I, EDWARD L. HYDE, of Centreville, in the county of Kent and State of Rhode Island, have invented a new and useful Improvement in Educational Maps, Charts, &c.; and I do hereby declare that the following specification, taken in connection with the accompanying drawings, forming a part of the same, is a full, clear, and exact description thereof.

My invention relates to geographical, geological, astronomical, and other maps, and to historical, biographical, and other charts.

My improvement consists in a map or chart of the same general character as is in common use, with the exception that there are omitted from such map or chart the names of cities, rivers, seas, mountains, &c., in the case of a geographical map; the names of periods, character of strata, rocks, &c., in a geological map; the names of planets, &c., in an astronomical map; the names of places, titles of events, dates, &c., in a historical chart, and the names of persons, dates of birth and death, &c., in a biographical chart, and such maps and charts are provided at the places where such names, titles, dates, &c., usually appear, with perforations or projecting pins adapted to receive cards or other objects bearing such names, titles, dates, &c.

The object of my invention is to provide a map or chart adapted to test the knowledge of a person as to the names and location of cities, &c., which usually appear thereon, and also adapted temporarily to hold at the proper places thereon cards or other objects bearing names, titles, dates, &c., as above recited.

Another object of my invention is to combine with the educational advantages of such a map or chart the recreative feature of a game, as will hereinafter appear.

Figure 1:
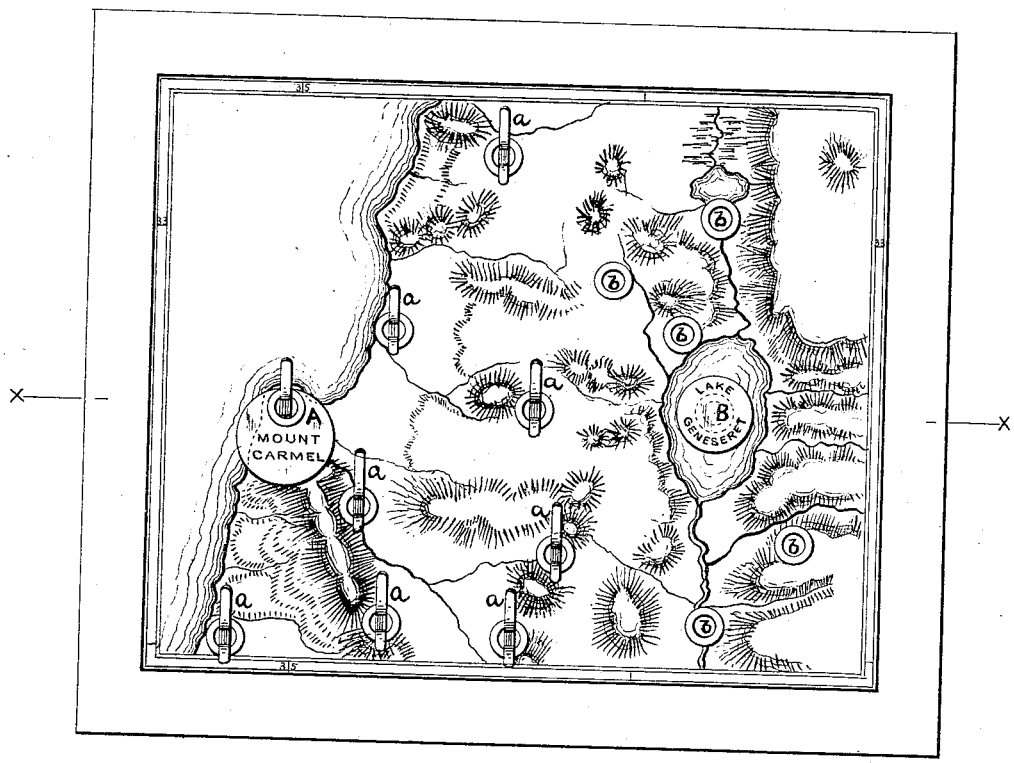
Figure 2:
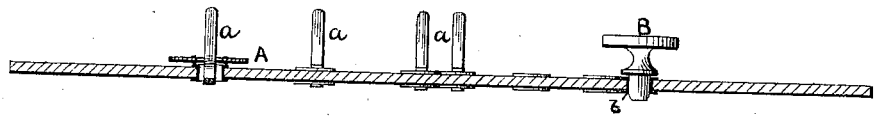

Referring to the drawings, Figure 1 represents a map of a portion of the Holy Land, embodying my improvement, which may be mounted on a backing of card-board, wood, or other material. Fig. 2 shows a section of the same.

As shown in Fig. 1 of the drawings, certain locations upon the map are provided with projecting pins *a*, which are adapted to receive perforated cards or disks A, bearing the names of such locations, or are provided with perforations or holes *b*, preferably bushed with metal and adapted to receive pins or plugs B bearing names. The pins *a* may be of any desired material, and may be secured to the body of the map in any preferred manner. As shown in the drawings, these pins are of sheet metal, and are secured in metal eyelets attached to the body of the map.

My improved maps and charts may be used for purely educational purposes in schools, &c., by distributing to the pupils perforated cards or plugs bearing names or dates, as described, which shall be placed upon the proper pins or in the proper holes by the pupils under any preferred rules or regulations, thereby testing their knowledge.

As a game which combines educational and recreative advantages, my improved maps and charts may be used in many ways, one of which will suffice as an example: Perforated cards or plugs bearing names, dates, &c., which are applicable to the map or chart employed, may be distributed among the players, and each may be required in turn to place a card or plug bearing a name or date which he holds upon the proper pin or in the proper hole. If he fails properly to place the card or plug, he shall be debarred from playing until his turn comes again. In the meantime opportunity is offered him to study the map or chart and remember, if possible, the location of the card or plug which he should have played.

By the use of my improved maps and charts the memory is stimulated, knowledge may be increased by observation, and a deeper impression is made on the mind than by the use of the usual forms of such maps and charts.

My improvement is also applicable to the illustration of the laws of harmony in music, and to those of form, color, &c.

What I claim, and desire to secure by Letters Patent, is—

The improved educational map or chart herein described, from which are omitted the names of places, &c., usually found on such maps or charts, and which is provided at the places where such names should appear with means, substantially as described, for receiving and temporarily holding supplemental cards, as described, bearing such names, substantially as and for the purposes specified.

EDWARD L. HYDE.

Witnesses:
W. H. THURSTON,
J. KNIGHT.